United States Patent [19]

Mahoney

[11] Patent Number: 4,663,858
[45] Date of Patent: May 12, 1987

[54] APPARATUS FOR MEASURING DIMENSIONS OF A SLIT

[75] Inventor: Thomas C. Mahoney, Federal Way, Wash.

[73] Assignee: The Boeing Company, Seattle, Wash.

[21] Appl. No.: 827,361

[22] Filed: Feb. 7, 1986

[51] Int. Cl.$^4$ ............................................. G01B 7/00
[52] U.S. Cl. .................................... 33/542; 33/143 L; 33/147 N
[58] Field of Search ................. 33/542, 147 N, 143 L, 33/148 R, 148 H, 143 R, 164 R, 1 N

[56] References Cited

U.S. PATENT DOCUMENTS

| | | | |
|---|---|---|---|
| 4,345,380 | 8/1982 | Vis | 33/147 N |
| 4,489,497 | 12/1984 | Schemel | 33/542 X |
| 4,554,742 | 11/1985 | Freitag | 33/143 L |

FOREIGN PATENT DOCUMENTS

| | | | |
|---|---|---|---|
| 864907 | 7/1958 | United Kingdom | 33/542 |
| 265296 | 9/1970 | U.S.S.R. | 33/542 |

*Primary Examiner*—Harry N. Haroian
*Attorney, Agent, or Firm*—Bruce A. Kaser

[57] ABSTRACT

A slit measurement device (10) is provided for taking various measurements of slit thickness along the slit's length. The device (10) includes a thin elongated probe (14) that is insertable into the slit (18) and which has a wide but flat end portion (26). The probe (14) is rotated in both a clockwise and counter-clockwise direction with rotation in both directions being constrained by the slit's walls (66,68). The total amount of rotation is used to calculate slit thickness.

18 Claims, 8 Drawing Figures

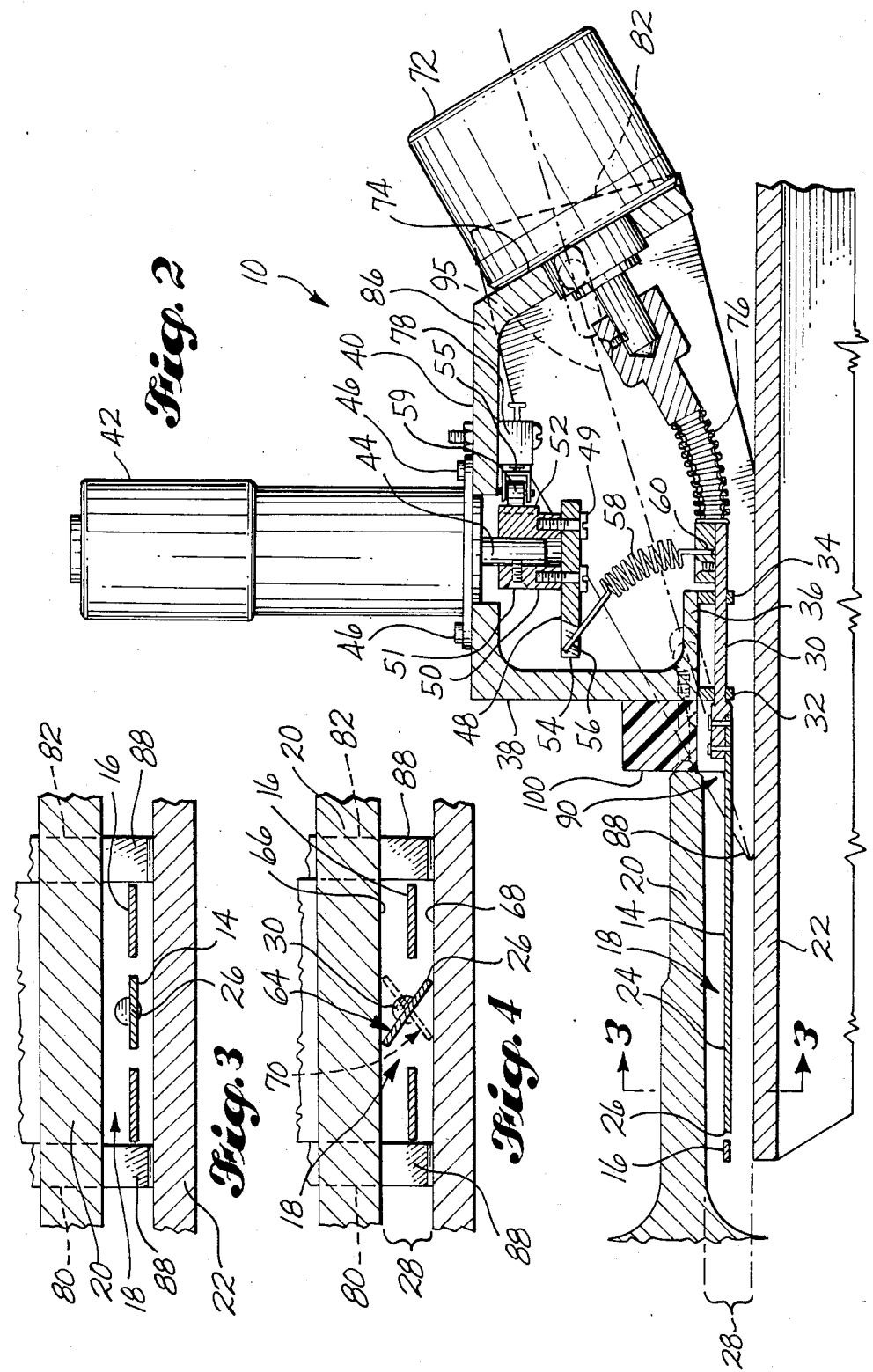

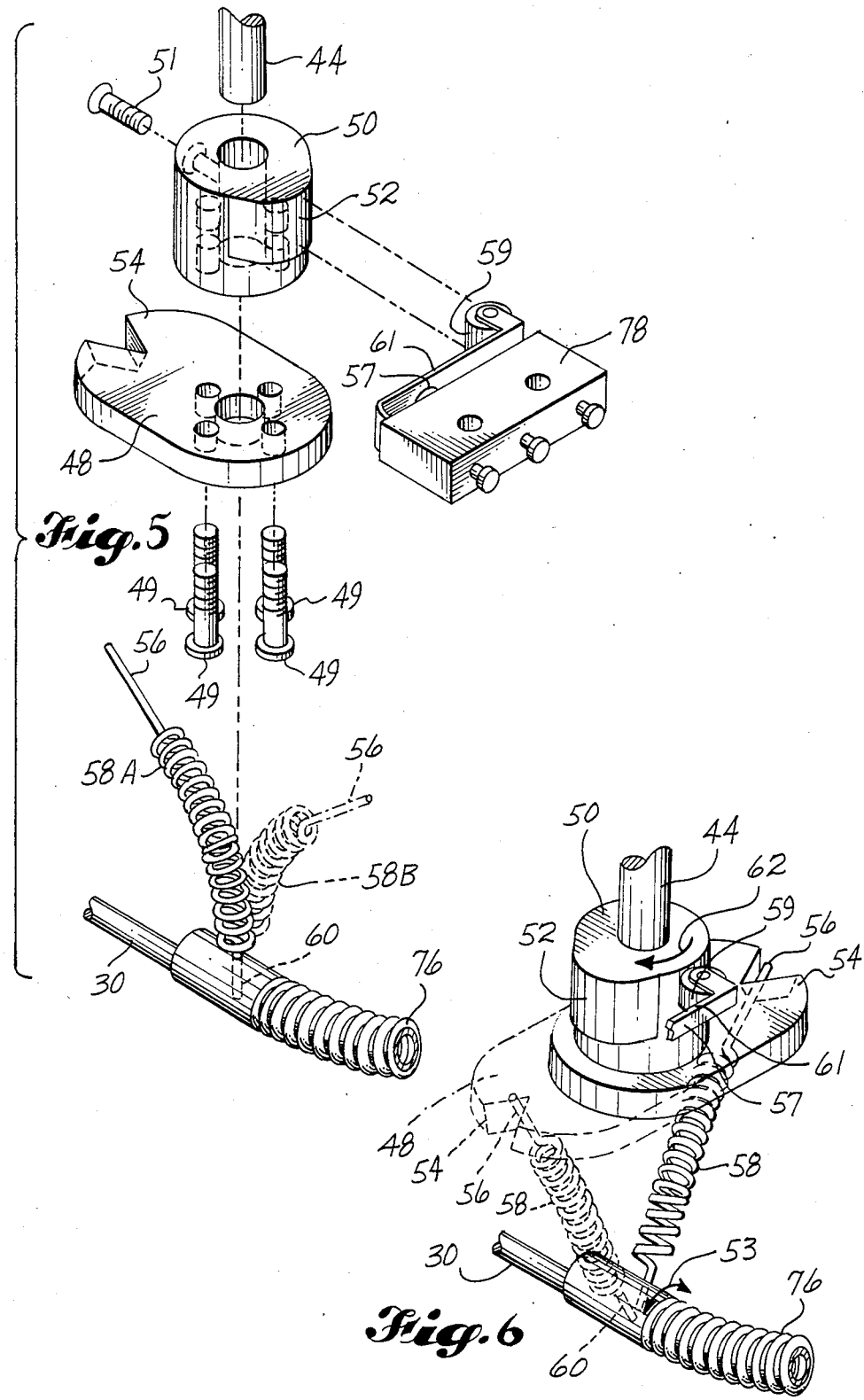

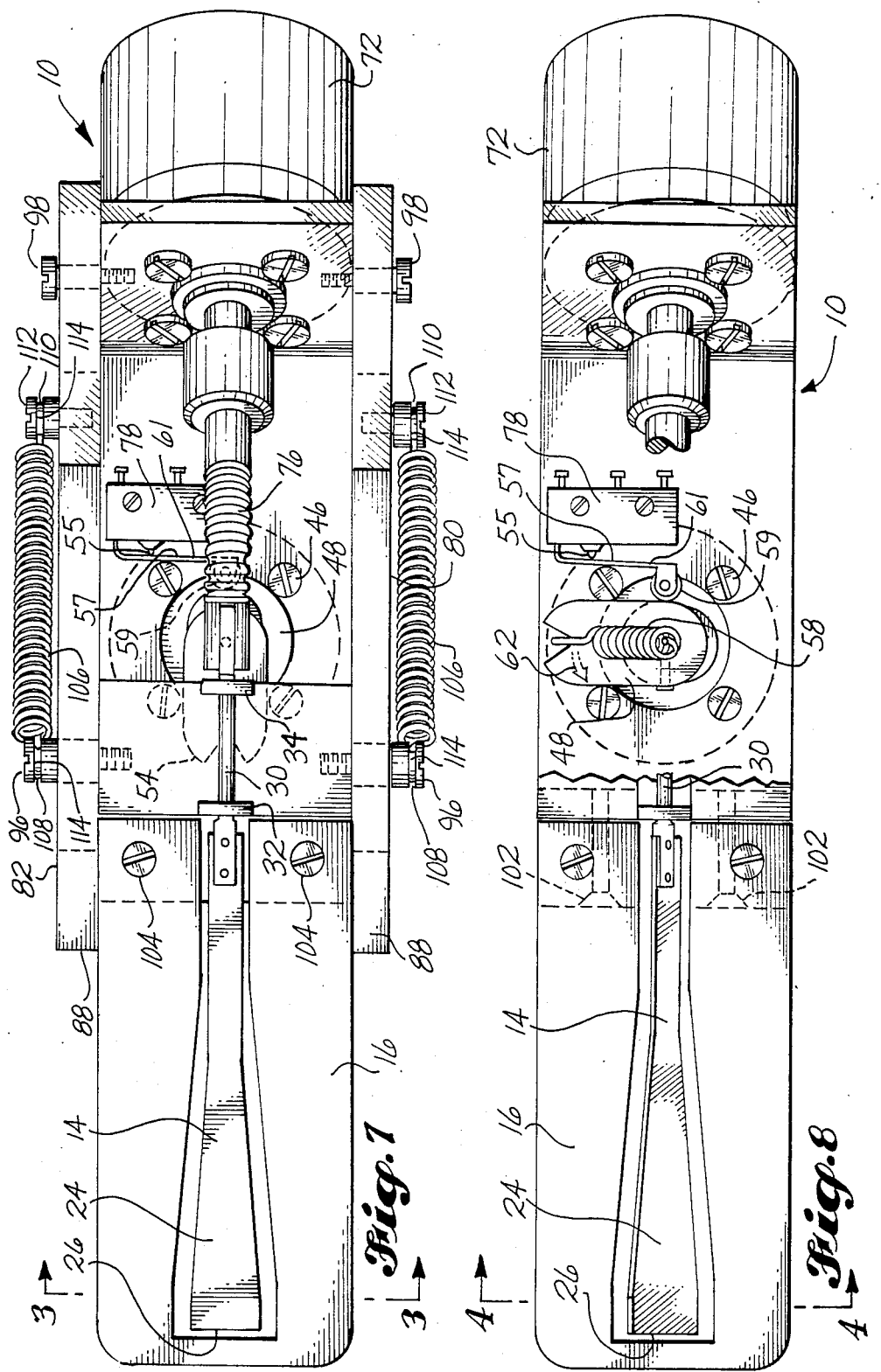

APPARATUS FOR MEASURING DIMENSIONS OF A SLIT

DESCRIPTION

1. Technical Field

This invention relates to devices and methods which can be used to measure the dimensions of small spaces. More particularly, the invention relates to a device and method for determining the dimensions of narrow slits which result when certain aircraft structures are to be mated together.

2. Background Art

During typical aircraft construction procedures, discrete aircraft structures are designed to be joined together in such a manner that slits or other narrow spaces occur between respective mating surfaces of each structure. Typically, these slits almost always occur between aircraft slip joints, or between a structural skin member and a rib, spar or bulkhead. It is common practice to fill such slits by using hand-fitted shims. During the construction of a typical commercial aircraft, for example, thousands of such shims will be required. Further, slit sizes and shapes are almost always a variable, meaning that as a practical matter it is impossible to prefabricate large numbers of shims having standard size. Each shim typically must be individually tailored by a worker on the job for the particular slit in which that shim will be used. Therefore, in the past, hundreds of man-hours have been expended per airplane in making hand-fitted shims. Because of this, there has been a long felt need to develop a method and/or apparatus which could quickly and accurately determine the dimensions of a slit. If a slit's dimensions could be easily obtained, then it would be possible to program a modern millilng machine's numerical control system to properly machine a shim that would fit the slit.

Many attempts have been made to develop systems and/or methods that can accurately provide slit dimensions. By way of example, utilizing molded shim space impressions, and capacitive and resistive shim space measurement probes are two of such developments, albeit they have been used with limited success. It should be appreciated that the shims serve as structural members and therefore it is a requirement that the shims be made of the same material as the structures being joined or mated together. This precludes, for example, use of "pour-in-place" or plastic liquid shims.

The most common limitation to previously known measuring devices is that typical slits are too small to insert therein most measuring probes associated with these devices. Referring to the above-mentioned capacitive and resistive probes, it is difficult to center such probes in deep and narrow slits, which is imperative if such a device is to be used to make an accurate measurement. Further, there is typically access to only one entrance or opening of any particular slit. As a practical matter, this prevents the use of many currently known optical measuring devices.

It has been known that NASA has developed a tile gap measurement tool which can measure gaps between tiles on the space shuttle. This tool utuilizes a manually operated gap thickness protractor, but is unsuitable for use in aircraft structures because the minimum thickness measurement for a shim space usually is at least 1/10th the NASA tile gap thickness. Another problem with the NASA tool is that it does not provide a motorized drive having an electronic read out, for facilitating automatic operation of the tool. This is critical in reducing man-hours associated with making a shim.

In the past, because of their thinness, feeler gauges have been the only acceptable tool for determining slit dimensions. Use of feeler gauges is a slow and time consuming process; and even feeler gauges cannot measure the inner thikness of the slit if the slit's entrance is thinner than the slit's interior. The present invention provides a fast and automatic method for measuring slit dimensions and appreciable speeds up the process of making and fitting a shim to fill a slit.

DISCLOSURE OF THE INVENTION

The invention provides an elongated probe member or probe that is sufficiently thin in cross-section for insertion into a slit whose space is to be filled by a shim. The probe is mounted to and projects outwardly from a frame. Also, the probe is mounted to the frame in a manner so that the probe is rotatable.

The probe has an end portion which is flat, and which has a certain transverse width that is greater than the thickness of the slit to be measured. To measure the slit's dimensions, the end portion of the probe is first inserted into the slit and a drive means, preferable in the form of an electric motor mounted to the device's frame, rotates the probe. The probe is rotated from an initial horizontal position in one of either a clockwise or counter-clockwise direction until the probe's end portion is constrained from further rotation by the walls of the slit. Then, the drive means rotates the probe in the other rotational direction until the probe's end portion is again constrained by the walls of the slit. After this, the drive means reverses probe rotation and rotates it back to its initial position.

The invention includes means for measuring the total amount of the above-described angular rotation of the probe, and for using such amount to determine slit thickness at the position measured. Obviously, thicker slits permit more total angular rotation, and thinner slits permit less. The amount of angular rotation can be mathematically and empirically correlated to a particular slit thickness. The above-described rotational procedure may be repeated several times at any particular measurement location for error averaging, thus enhancing accuracy of the measurement results.

The frame includes a forward portion, a rearward portion and a top portion interconnecting the forward to the rearward portion. The electric motor is mounted to the top portion of the frame and has an output shaft extending downwardly therethrough. Connected to the output shaft is a radially extending drive arm. A wobble spring couples the drive arm to the probe. More specifically, the probe has a rotatable shaft portion that is connected by means of at least one bearing to a lower part of the frame's forward portion. A first end of the wobble spring is connected to the drive arm and a second end of the wobble spring is connected to this rotatable shaft. As the radial arm rotates or is driven in a circular path by the motor's output shaft, the wobble spring causes the probe member to rotate in two directions per 360° arc of the drive arm. An electro-optical shaft encoder, which provides a signal indicative of the probe's rotation, is mounted to the rearward portion of the frame. The encoder is coupled to the probe member by means of a flexible coupling.

The stopping position of the probe is controlled by a stop/run switch that is operatively connected to the motor. The switch is mounted to the frame in a position so that a cam portion of the drive arm triggers the switch when the drive arm reaches certain positions. Preferably, the stopping position is reached when the probe's end portion is substantially horizontal, or otherwise in a position for insertion into the slit.

A pair of guide members are mounted to the lateral sides of the frame. The guide members both support the frame, and consequently, the probe as well. The guide members provide a means for guiding the probe into the slit so that it is positioned substantially centrally in the slit. Each guide member has an angled toe portion that is insertable into the slit's opening or entrance. Further, each guide member is connected to the frame in a manner so that the position of each guide member can be adjusted relative to the frame. Such adjustment is what is used to cause a change in the position of the probe and the probe's end portion inside the slit. The actual attachment of each guide member to the frame is accomplished by a pair of slots extending through the thickness of each guide member. Each slot is substantially in alignment with a line that bisects the angle of each guide member's angled toe portion. One of the slots is located adjaent the forward portion of the frame and the other slot is adjacent the rearward portion of the frame. Shoulder screws extend through each slot and into the frame's forward and rearward portions, respectively, and provide a means for adjustable connecting each guide member to the frame.

The frame and guide members form a substantially enclosed space in which is housed the drive arm, wobble spring, probe shaft, and a flexible coupling member which connects the probe shaft to the encoder.

An advantage to the present invention is that the wobble spring is used in a manner such that it provides repetitive torque on the probe when the probe's end portion is constrained by the slit's walls in each rotational direction. Providing repetitive torque is important because it permits the invention to make consistently precise measurements of slit dimensions. This advantage, and others, will become apparent upon reading the following description of the invention in conjunction with the accompanying drawings.

BRIEF DESCRIPTION OF THE DRAWINGS

In the drawings, like reference numerals and letters refer to like parts throughout the various views, and:

FIG. 2 is a side cross-sectional view of the right side of the device shown in FIG. 2, and is taken along the center line of the device;

FIG. 3 is a fragmentary end sectional view of the device showing the device's measuring probe inserted into a slit, and is taken along line 3—3 in FIG. 2;

FIG. 4 is a view like FIG. 3 but shows changes in the rotational position of the measuring probe when it is used to measure slit thickness;

FIG. 5 is an enlarged exploded pictorial view of a drive arm and wobble spring mechanism which rotates the probe shown in FIGS. 1–4;

FIG. 6 is a view like FIG. 5, but is not in exploded format, and shows two different positions of the wobble spring as the drive arm rotates;

FIG. 7 is a bottom plan view of the device shown in FIGS. 1 and 2;

FIG. 8 is a view like FIG. 7 with part of the device bing cut away to show rotation of the device's drive arm and wobble spring.

BEST MODE FOR CARRYING OUT THE INVENTION

Figure 1:
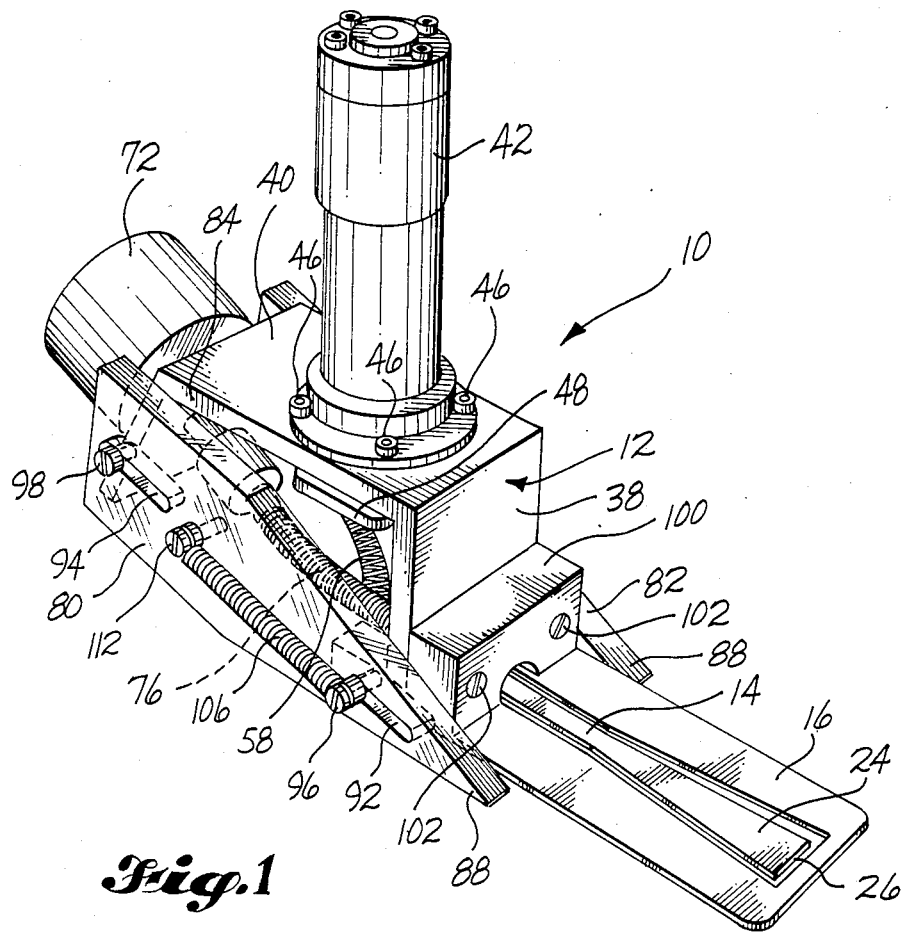
FIG. 1 is a pictorial view of a preferred embodiment of the device.

Referring now to the drawings, and first to FIG. 1, therein is shown at 10 an automatic slit measurement device constructed in acordance with a preferred embodiment of the invention. Basically, the device 10 includes a frame 12 from which projects outwardly a probe member or probe 14. The probe 14 is surrounded by a probe guard 16.

Directing attention now specifically to FIG. 2, therein is shown the probe and probe guard 14, 16 inserted into a slit, indicated generally at 18, which is created between an upper aircraft structure 20 and a lower aircraft structure 22. As is apparent, not only are the probe and probe guard 14, 16 relatively thin members but they are also relatively flat and wide.

The probe 14 has an outwardly diverging portion 24 terminating in an end portion 26. The end portion 26 has a transverse width that is wider than the slit's thickness, the latter being indicated generally by bracket 28. A portion of the probe 14 is in the form of a rotatable probe shaft 30. This shaft 30 is connected by a pair of bearings 32, 34 to a lower part 36 of the frame's forward portion 38.

Mounted to the top portion 40 of the frame 12 is an electric motor 42 having an output shaft 44. By way of nonlimitative example only, such motor 42 may be a 50 rpm permanent magnet gear motor. A typical motor of this type is a TRW Globe type S5 43A101-02 motor manufatured by TRW Inc. The motor 42 is mounted to the frame's top portion 40 by a plurality of nut and bolt connections 46 or other suitable means.

Connected to the motor's output shaft 44 is a radially extending drive arm 48. The drive arm 48 is connected to the output shaft by means of a plurality of threaded bolts 49, which connect the drive arm to a cam 50, wherein the cam is attached directly to the motor's output shaft 44. The cam 50 is attached by means of a set screw 51.

Connected to the radially outward end 54 of the drive arm 48 is one end 56 of a wobble spring 58. A second end 60 of the spring is suitably connected to the probe's shaft portion 30. Referring now to FIGS. 5 and 8, the motor 42 drives the end 54 of the drive arm 48 in a circular path indicated by arrow 62. This in turn drives the first end 56 of the wobble spring 58 in this same motion. Driving the end of the wobble spring in this manner causes the wobble spring to place a moment force or torque on the probe shaft 30, the direction of which varies depending on the position of the drive arm 48. The net result is that the probe 14 is caused to rotate in two opposite rotational directions for each rotation of the drive arm 48.

To illustrate, and referring now to FIG. 2, when the drive arm is in a position such that its end 54 is projecting forwardly, the wobble spring 58 is bent in the same direction and places no torque about the axis of the probe 14. This is further illustrated in FIG. 5 by the wobble spring 58A drawn in solid lines. When the drive arm 48 is displaced either 90° or 270° from the position shown in FIG. 2, the wobble spring 58 is then turned sideways relative to its initial position, and it consequently exerts either a clockwise or counter-clockwise torque about the probe's axis, depending on the position of the drive arm. For example, referring now to FIG. 6, which is a perspective view of the drive arm 48, wobble spring 58, and probe shaft 30, the drive arm is shown therein displaced 90° (in solid lines) and 270° (in dashed lines) from its initial position shown in FIG. 2. At the 90° position, a clockwise torque is placed on the probe shaft 30. At the 270° position, a counter-clockwise torque is placed on the probe shaft. These torques cause the probe 14 to rotate, respectively, in the directions indicated by arrows 53. In FIG. 8, the probe 14 and its end portion 26 are shown rotated when the drive arm 48 is in the 270° position.

To measure the thickness of the slit 18, the probe 14 is inserted into the slit when the drive arm 48 is positioned forwardly, and the probe's diverging portion 24 is in a horizontal position and coplanar with the probe guard 16. (See FIG. 3). The drive motor 42 is then activated and rotates the drive arm 48 at least once in the direction indicated by arrow 62. Referring to FIG. 4, when the drive arm 48 is moved in an arc from 0° to 90°, the torque exerted by the wobble spring 58 causes clockwise rotation of the probe to the position indicated by arrow 64. In other words, the probe rotates until its end portion 26 is constrained between the walls 66, 68 of the slit 18. As the drive arm 48 continues its rotation from the 90° to the 270° position, the torque exerted by the wobble spring 58 reverses. Specificially, when the drive arm 58 is displaced 180° from the position shown in FIG. 2 (see 58B, FIG. 5), the probe 14 is once again in a substantially horizontal position. Then, when the drive arm is displaced 270°, as shown in FIG. 8, the wobble spring 58 exerts a counter-clockwise torque on the probe 14 causing it to be rotated into the position shown by arrow 70 in FIG. 4. At this point, the probe's end portion 26 is once again constrained between the slit's walls 66, 68. Finally, when the drive arm 48 returns to its initial position, the probe 14 likewise returns to a horizontal position.

The total amount of probe 14 rotation described in the paragraph above can be used to measure slit thickness. The transverse width 26 and thickness of the probe's end portion 26 is either a known or easily obtainable parameter. If the total stop-to-stop rotation of the probe is known, from the initial horizontal position to the final horizontal position, then the width of the slit can be calculated from the following mathematical expression:

$$G = W \sin \theta + T \cos \theta$$

where
  G = slit width (at particular location measured)
  W = width of probe's end
  T = thickness of probe
  $\theta$ = (total stop-to-stop rotation)/2

The total stop-to-stop rotation of the probe 14 is measured by an electro-optical shaft encoder 72 which is mounted to a rearward portion 74 of the frame 12. By way of example only, a suitable encorder for use in practicing the present invention is a Litton Model Type No. 74B2360-1-12 encoder manufactured by Litton Inc. The encorder 12 is connected to the probe's rotatable shaft 30 by means of a flexible coupling member 76. Shaft rotation is broken up into preselected increments of rotation and the encoder produces an electrical pulse for each increment of rotation, no matter the direction. The encoder 72 is connected to an electronic counter (not shown in the drawings) which counts the rotation pulses. The number of pulses can be compared to empirically derived data in conjunction with the above equation to instantaneously provide a slit thickness measurement.

In preferred form, and as was mentioned above, the rotation of the probe 14 is initiated when the probe is in a horizontal initial position. This position is initialized by a motor stop/run switch 78 which is operatively connected to the motor 42. The stop switch 78 is suitably mounted to the top portion 40 of the frame 12 in a position so that a cam lobe 52 of the cam 50 triggers the switch, to stop the motor when the drive arm 44 extends forwardly. Switch 78 is a single pole, double throw, snap action switch and has a small roller 59 which is in continual contact with the outer surface of the coupling member 50. When the cam 50 extends rearwardly, it bends a spring portion 61 of the switch so that an inner surface 57 of the spring 61 depresses a plunger 55 and actuates a switch contact inside switch 78. When this happens, the switch turns off the motor 42.

To operate the invention, once the probe's position has been initialized, the switch 78 is initially deactivated or bypassed by suitable circuitry which would be known to a person skilled in the art (not shown in the drawings), to start the motor 42 and thereby cause it to drive the drive arm 48 in rotation. It may be desired to drive the drive arm many rotations for the purpose of enhancing the accuracy of measurement, but at least one complete rotation is mandatory.

To obtain accurate slit dimensions, it is important that the probe 14 is centrally located in the slit 18 in the manner shown in FIG. 2. So locating the probe 14 is accomplished by a pair of guide members 80, 82, which are attached to the lateral sides 84, 86 of the frame 12. Each guide member 80, 82 has an angled toe portion 88 which is inserted into the opening 90 of the slit 18. Each guide member 80, 82 is attached to the frame 12 by means of a pair of slots 92, 94. The slots are positioned along a line 95 that substantially bisects the angle defined by the guide member's toe portion 88. Guide pins 96, 98, extending through the slots 92, 94, are threaded into the forward and rearward portions 38, 74 of the frame 12, respectively. Since the guide slots 92, 94 are positioned in alignment with the bisector 95 of the guide member's toe portions 88, the angles of the guide slots are approximately half the toe portions' angle. The guide pins 96, 98 permit slidable movement of the guide members 80, 82 relative to the frame which likewise moves the position of the probe 14 vertically in the slit 18.

Longitudinal positioning of the guide members 80, 82 relative to the frame 12 is facilitated by means of a pair of tensioning springs 106, one for each guide member. Each tensioning spring 106 is connected at one end 108 to the forward guide pin 96, and the other end 110 to a pin 112 which is joined to each guide member. Such connections are made by the ends of the springs 106 being received within grooves 114 in the pins 96, 112. The springs 106 are biased to pull the guide members forwardly until their toe portions 88 fill the entire thickness of the slit entrance.

An indexing member 100 is connected to the frame's forward portion 38. The indexing member 100 may be connected to the frame 12 by means of flat head screws 102, or any other suitable means. To locate the probe end portion 26 in proper position for measurement, the indexing member is abutted against the slit's opening.

The probe guard 16 is also connected to the bottom of the indexing member 100 by means of screws 104.

The best mode for carrying out the invention as described above is provided herein for illustrative purposes only. It is to be understood that certain modifications could be made to the invention without departing from the spirit and scope thereof. Any preceeding statements are not meant to limit patent protection. The limits of patent protection are defined solely by the claims which follow, in accordance with the established doctrines of patent claim interpretation as set forth in the patent law.

What is claimed is:

1. For use in measuring the thickness of a narrow slit, a device comprising:
    a frame;
    an elongated probe member that is thin in cross-section for insertion into said slit, said probe member including an end portion having a transverse width that is greater than the thickness of said slit, with said probe member being connected to said frame in a manner so that said probe member projects from said frame and is rotatable;
    electric motor drive means, for rotating said probe member in both a clockwise and counter-clockwise direction when said probe member is inserted into said slit;
    electro-optical encoder means for measuring probe member rotation, and for using such rotation to determine slit width;
    wherein said electric motor drive means includes
    a motor mounted to said frame, said motor having an output shaft;
    a radially extending drive arm connected to said motor output shaft; and
    a wobble spring having a first end connected to said drive arm and a second end connected to said probe member.

2. The device as set forth in claim 1, wherein said measuring means includes an electro-optical shaft angle encoder coupled to said probe member.

3. The device as set forth in claim 2, wherein said drive means further includes a cam portion connected to said motor shaft, and including an electric stop/run switch operatively connected to said motor, said switch being mounted to said frame adjacent said cam portion in a position so that said switch is triggered by said cam portion when said drive arm is in a particular position.

4. The device as set forth in claim 3, including a pair of guide members for guiding said probe member into said slit and for centering said probe member in said slit, each guide member having an angled toe portion that is insertable into the opening of said slit, and each guide member being slidably connected to a lateral side portion of said frame, in a manner so that the position of said guide member may adjust itself relative to said frame, and in a manner so that such adjustment causes a change in the vertical position of said probe member in said slit when said probe member is inserted therein.

5. The device as set forth in claim 4, wherein each guide member includes a pair of slots extending through the thickness of each guide member, each slot being substantially in alignment with a line that bisects the angle of said angled toe portion, with one of said slots being adjacent a forward portion of said frame, and with the other of said slots being adjacent a rearward portion of said frame, and including a first shoulder screw connecting that slot which is adjacent said forward portion to said forward portion, and further including a second shoulder screw connecting that slot which is adjacent said rearward portion to said rearward portion.

6. The device as set forth in claim 5, wherein said frame includes a top portion interconnecting said forward and rearward portions, and wherein said top portion, said forward portion, said rearward portion and said guide members are positioned relative to each other so as to define a space, said motor being mounted to said top portion and with said motor shaft extending downwardly through said top portion into said space, and wherein said drive arm and said wobble spring are received within said space.

7. The device as set forth in claim 6, wherein said probe member has a rotatable shaft connected to a lower portion of said frame's forward portion by at least one bearing.

8. The device as set forth in claim 7, wherein said electro-optical encoder is mounted to said frame's rearward portion, said electro-optical encoder being connected to said probe member's rotatable shaft by a flexible coupling member.

9. The device as set forth in claim 1, wherein said drive means further includes a cam lobe portion, and including an electric stop switch operatively connected to said motor, said switch being mounted to said frame adjacent said cam lobe portion in a position so that said switch is triggered by said cam lobe portion when said drive arm is in a particular position.

10. The device as set forth in claim 9, wherein said frame includes a forward portion, a rearward portion, and a top portion interconnecting said forward and rearward portions, said frame portions being positioned relative to each other in a manner so as to define a space between them, with said motor being mounted to said top portion, and with said motor shaft extending downwardly through said top portion into said space, and wherein said drive arm and said wobble spring are received within said space.

11. The device as set forth in claim 10, wherein said probe member has a rotatable shaft connected to a lower portion of said frame's forward portion by at least one bearing.

12. The device as set forth in claim 11, wherein said electro-optical encoder is mounted to said frame's rearward portion, said encoder being connected to said probe member's rotatable shaft by a flexible coupling member.

13. The device as set forth in claim 1, including a pair of guide members for guiding said probe member into said slit and for centering said probe member in said slit, each guide member having an angled toe portion that is insertable into the opening of said slit, and each guide member being slidably connected to a lateral side portion of said frame, in a manner so that the position of said guide members may be adjusted relative to said frame, and in a manner so that such adjustment causes a change in the vertical position of said probe member in said slit when said probe member is inserted therein.

14. The device as set forth in claim 13, wherein each guide member includes a pair of slots extending through the thickness of each guide member, each slot in each respective guide member being substantially in alignment with a line that bisects the angle of said guide member's angled toe portion, with one of said slots being adjacent a forward portion of said frame, and with the other of said slots being adjacent a rearward portion of said frame, and including a first shoulder screw connecting that slot which is adjacent said forward portion to said forward portion, and further including a second shoulder screw connecting that slot which is adjacent said rearward portion to said rearward portion.

15. The device as set forth in claim 14, wherein said measuring means includes an electro-optical shaft angle encoder coupled to said probe member.

16. The device as set forth in claim 15, wherein said frame includes a top portion interconnecting said frame's forward and rearward portions, and wherein said top portion, said forward portion, said rearward portion and said guide members are positioned relative to each other so as to define a space, said motor being mounted to said top portion and with said motor shaft extending downwardly through said top portion into said space, and wherein said drive arm and said wobble spring are received within said space.

17. The device as set forth in claim 16, wherein said probe member has a rotatable shaft connected to a lower portion of said frame's forward portion by at least one bearing.

18. The device as set forth in claim 17, wherein said electro-optical encoder is mounted to said frame's rearward portion, said encoder being connected to said probe member's rotatable shaft by a flexible coupling member.

* * * * *

UNITED STATES PATENT AND TRADEMARK OFFICE
CERTIFICATE OF CORRECTION

PATENT NO. : 4,663,858

DATED : May 12, 1987

INVENTOR(S) : Thomas C. Mahoney

It is certified that error appears in the above—identified patent and that said Letters Patent are hereby corrected as shown below:

First page, second column, under "FOREIGN PATENT DOCUMENTS", insert:

216,190    11/1941    Switzerland
1,030,648    7/1983    Russia

Column 1, line 36, "mililng" should be -- milling --.

Column 1, line 63, "utuilizes" should be -- utilizes --.

Column 2, line 8, "thikness" should be -- thickness --.

Column 2, line 11, "appreciable" should be -- appreciably --.

UNITED STATES PATENT AND TRADEMARK OFFICE
CERTIFICATE OF CORRECTION

PATENT NO. : 4,663,858

DATED : May 12, 1987

INVENTOR(S) : Thomas C. Mahoney

It is certified that error appears in the above-identified patent and that said Letters Patent are hereby corrected as shown below:

Column 2, line 26, "preferable" should be -- preferably --.

Column 3, line 26, "adjaent" should be -- adjacent --.

Column 3, line 30, "adjustable" should be -- adjustably --.

Column 4, line 2, "bing" should be -- being --.

Column 4, line 9, "acordance" should be -- accordance --.

Column 4, line 34, "manufatured" should be -- manufactured --.

Column 5, line 28, "drive arm 58" should be -- drive arm 48 --.

Signed and Sealed this

Tenth Day of November, 1987

Attest:

DONALD J. QUIGG

*Attesting Officer*  *Commissioner of Patents and Trademarks*